(12) United States Patent
Snijders et al.

(10) Patent No.: US 10,627,274 B2
(45) Date of Patent: Apr. 21, 2020

(54) METHOD FOR DETERMINING A FLOW RATE FOR A FLUID IN A FLOW TUBE OF A FLOW MEASUREMENT SYSTEM, AS WELL AS A CORRESPONDING FLOW MEASUREMENT SYSTEM

(71) Applicant: Berkin B.V., Ruurlo (NL)

(72) Inventors: Gert Jan Snijders, Ruurlo (NL); Eduard Dieter Van Hattum, Ruurlo (NL); Coen Adriaan Robert Tom Bruggeman, Ruurlo (NL)

(73) Assignee: BERKIN B.V., Rurrlo (NL)

( * ) Notice: Subject to any disclaimer, the term of this patent is extended or adjusted under 35 U.S.C. 154(b) by 138 days.

(21) Appl. No.: 15/749,342

(22) PCT Filed: Jul. 26, 2016

(86) PCT No.: PCT/NL2016/050553
§ 371 (c)(1),
(2) Date: Jan. 31, 2018

(87) PCT Pub. No.: WO2017/023167
PCT Pub. Date: Feb. 9, 2017

(65) Prior Publication Data
US 2018/0224307 A1      Aug. 9, 2018

(30) Foreign Application Priority Data
Jul. 31, 2015   (NL) ...................................... 2015247

(51) Int. Cl.
*G01F 1/66*   (2006.01)
*G01F 1/74*   (2006.01)
*G01F 1/708*  (2006.01)

(52) U.S. Cl.
CPC .............. *G01F 1/667* (2013.01); *G01F 1/662* (2013.01); *G01F 1/74* (2013.01); *G01F 1/7082* (2013.01)

(58) Field of Classification Search
CPC ............ G01F 1/66; G01F 23/29; G01N 29/02
See application file for complete search history.

(56) References Cited

U.S. PATENT DOCUMENTS

| 4,003,252 A | * | 1/1977 | Dewath .................... G01F 1/66 73/861.27 |
| 4,628,725 A | | 12/1986 | Gouilloud et al. |

(Continued)

FOREIGN PATENT DOCUMENTS

| DE | 4400448 | 7/1995 |
| WO | WO 2011/039311 | 4/2011 |
| WO | WO 2014/001027 | 1/2014 |

OTHER PUBLICATIONS

International Search Report and Written Opinion for PCT/NL2016/050553, dated Oct. 20, 2016, 11 pages.

*Primary Examiner* — Jewel V Downtin
(74) *Attorney, Agent, or Firm* — Casimir Jones, S.C.; Tanya Arenson (57) ABSTRACT

Flow measurement system comprising a flow tube for the fluid whose flow rate is to be determined, wherein said system comprises at least three ultrasound transducer circuitry, wherein each circuitry comprises an ultrasound transducer arranged for transmitting ultrasound signals through said fluid in a transmitting phase, and for receiving transmitted signals from another of said at least three ultrasound transducers in a receiving phase, multiple receiving circuits, wherein each receiving circuit is arranged for reading out one of said at least three ultrasound transducers in a corresponding receiving phase thereof, and multiplexer circuitry ground arranged for selectively connecting each of said (Continued)

multiple receiving circuits to a different one of said at least three ultrasound transducers, respectively.

22 Claims, 2 Drawing Sheets

(56) References Cited

U.S. PATENT DOCUMENTS

| | | | | |
|---|---|---|---|---|
| 5,974,897 | A * | 11/1999 | Koyano | G01F 1/662 73/861.29 |
| 7,069,793 | B2 * | 7/2006 | Ishikawa | G01F 1/662 73/861.18 |
| 8,474,327 | B2 * | 7/2013 | Aughton | E02B 7/26 73/861.28 |
| 9,970,798 | B2 * | 5/2018 | Barkin | G01F 1/667 |
| 2008/0234950 | A1 * | 9/2008 | Kim | F22B 37/003 702/51 |
| 2011/0094309 | A1 | 4/2011 | Berger et al. | |
| 2014/0238116 | A1 * | 8/2014 | Kwan | G01F 1/667 73/61.79 |
| 2017/0314979 | A1 * | 11/2017 | Ye | E21B 21/08 |

* cited by examiner

METHOD FOR DETERMINING A FLOW RATE FOR A FLUID IN A FLOW TUBE OF A FLOW MEASUREMENT SYSTEM, AS WELL AS A CORRESPONDING FLOW MEASUREMENT SYSTEM

The invention relates to a method for determining a flow rate for a fluid in a flow tube of a flow measurement system, wherein said system comprises at least two ultrasound transducer circuitry, wherein each circuit comprises an ultrasound transducer arranged for transmitting ultrasound signals through said fluid in a transmitting phase, and for receiving transmitted signals from another of said at least two ultrasound transducers in a receiving phase.

Such a flow measurement system is known, for example from U.S. Pat. No. 6,055,868, which describes a flow measurement system comprising two ring-shaped oscillators. The oscillators are alternately activated to emit ultrasound signals, which signals are received, detected by the other, non-transmitting oscillator. The time the ultrasound signals require to propagate upstream and the time the ultrasound signals require for propagating downstream, as well as the time difference there between, is used for determining the velocity of the fluid in the flow tube.

International patent application WO2011039311 discloses a method for measuring the flow velocity of a medium by means of at least one emitter for generating acoustic waves and at least one receiver disposed at a distance from the emitter for receiving acoustic waves. To this end, acoustic surface waves are induced by the emitter on a substrate, which has a surface facing the medium, which waves in turn induce acoustic waves propagating in the medium, so that a plurality of wave trains propagate between the emitter and the receiver on propagation paths, at least some of which run through the medium, and are received by the at least one receiver.

One of the always existing challenges in the field of determining the flow rate for a fluid, is to improve the accuracy of the measurements. That is to say, the flow rate for a fluid in a flow tube should be determined as accurately as possible.

It is therefore an object of the present invention to provide a method for determining a flow rate for a fluid in a flow tube in a more accurate fashion.

It is another object of the present invention to provide a corresponding flow measurement system.

In order to achieve the first object, the invention provides, in a first aspect thereof, a method for determining a flow rate for a fluid in a flow tube of a flow measurement system, said system comprising at least three ultrasound transducer circuitry, wherein each circuit comprises an ultrasound transducer arranged for transmitting ultrasound signals through said fluid in a transmitting phase, and for receiving transmitted signals from another of said at least three ultrasound transducers in a receiving phase, said method comprising the steps of:

a1) exciting a first one of said at least three transducers to transmit said ultrasound signals, in said transmitting phase, and reading out at least two non-transmitting transducers of said at least three transducers, in their receiving phase, and, determining a first time difference between two of said readings of said at least two non-transmitting transducers, and b) determining a velocity of said ultrasound signals through said fluid based on at least said determined difference, thereby eliminating a transmitting delay of said first one of said at least three transducers.

The inventors found that time delays and/or time errors occurring in the ultrasound transducer circuitry adversely affect the accuracy of the flow rate measurements.

These time delays and/or time errors may be filtered out, i.e. ignored, in case the flow measurement system comprises at least three transducers, wherein a single transducer is excited to transmit ultrasound signals, and wherein at least two other transducers are receiving those transmitted ultrasound signals, and wherein the velocity of the ultrasound signals through said fluid is based on the time difference between the exact moments of the readings. As such, the time difference between transmitting the ultrasound signal and the receipt thereof by any of the non-transmitting transducers is not taken into account. It is thus the time difference between the receipt of the ultrasound signal at a first non-transmitting transducer and the receipt of the same ultrasound signal at a second non-transmitting transducer that is used for determining the velocity of the ultrasound signals trough the fluid.

In such a case, time delays and/or time errors occurring during the control of the single transducer to the transmitting phase, i.e. such that the single transducer is excited, may be filtered out by receiving the transmitted ultrasound signals at two, different, transducers. For example, in case the two, different, transducers are both placed either upstream or downstream with respect to the excited transducer, the time difference between receiving the ultrasound signals at these two, different, transducers may be used for determining the flow rate.

In accordance with the present invention the method may be used for accurately determining different types of flow rates, such as the fluid flow rate, the mass flow rate of the fluid and the volume flow rate of the fluid.

In an embodiment, the method further comprises a step a2) exciting a second one of said at least three transducers to transmit said ultrasound signals, in said transmitting phase, and reading out at least two non-transmitting transducers of said at least three transducers, in their receiving phase, and, determining a second time difference between two of said readings of said at least two non-transmitting transducers;

and wherein said step b) further comprises:

b) determining a velocity of said ultrasound signals through said fluid based on at least said determined first time difference and said second time difference.

Here below, an explanation of the advantages of the above described embodiment is provided with respect to exactly three ultrasound transducer circuitry, wherein the three ultrasound transducers are placed successively to each other in, or at, the flow tube, and wherein the physical distances between these three ultrasound transducers are known beforehand.

The reasoning may, however, be extended to more than three ultrasound transducer circuitry as apparent to a person skilled in the art. It may be advantageous in case more than three non-transmitting transducers are placed upstream and/or downstream, to the transmitting transducer. This, because in such a case, multiple, separate, time differences between the received ultrasound signals at the non-transmitting transducers may be determined, wherein the determination of the flow rate may be averaged over all these determined multiple time differences.

The excited transducer in step a1) of the method will transmit ultrasound signals through the fluid towards two non-transmitting transducers.

The time difference between the received signals at these two non-transmitting transducers then depends on, amongst other, the velocity at which the ultrasound signals propagate through the fluid, and the flow rate of the fluid itself.

The excited transducer in step a2) of the method will also transmit ultrasound signals through the fluid towards two non-transmitting transducers. To be clear, in step a2), the excited transducer is different compared to the excited transducer in step a1).

Based on the above, one remains with a set of two equations and two unknown variables, which can be solved to obtain 1) the velocity of the ultrasound signals in the fluid, and 2) the flow rate of the fluid itself.

As may be clear from the above, in case of three ultrasound transducers, in step a1) the first outer transducer of the three transducers is excited, and in step a2) the second outer transducer of the three transducers is excited. It is also possible that the middle transducer is excited in any of the steps a1) and a2).

In an embodiment, said method further comprises the step of:

a3) exciting a third one of said at least three transducers to transmit said ultrasound signals, in said transmitting phase, and reading out at least two non-transmitting transducers of said at least three transducers, in their receiving phase.

In order to further improve the accuracy of the measurements, even more transducers may be excited, one at the time, and at least two non-transmitting transducers of the at least three transducers may be read out, each time, resulting in multiple measurements for the flow rate. These measurements may then be averaged to further filter out any inaccuracies.

In an embodiment, the method further comprises the step of:

a4) alternately exciting a remainder of said at least three transducers to transmit said ultrasound signals, in said transmitting phase, and reading out, for each alternately excited transducer, at least two non-transmitting transducers of said at least three transducers, in their receiving phase.

In another embodiment, the method steps are performed multiple times to further improve the accuracy of the measurements, for example each step is performed twice.

In an embodiment, the method further comprises the steps of:

determining an attenuation in amplitude of said received ultrasound signals based on said read out at least two non-transmitting transducers of said at least three transducers;

determining transmission coefficients for medium transitions occurring for said transmitted ultrasound signals between said at least two non-transmitting transducers, and based on said determined attenuation in amplitude;

determining a mass density of said fluid based on said determined attenuation and said determined transmission coefficients for determining a mass flow rate of said fluid.

The inventors found that by reading out at least two non-transmitting transducers of said at least three transducers, the attenuation in amplitude of their received ultrasound signals can be determined. The inventors further noted that the transmitted ultrasound signals are subjected to medium transitions, which will be explained in a bit more detail further on. Finally, the inventors found that the mass density of the fluid can be determined based on the determined attenuation and the determined transmission coefficients, as the transmission coefficients for the medium transitions at least depend on the mass density of the fluid.

Once the fluid flow rate and the mass density of the fluid have been determined, a mass flow rate of the fluid can be established.

In the context of the present invention, a transmission coefficient relates to the attenuation of transmitted ultrasound signals which pass from a first medium to a second medium, i.e. a medium transition.

Medium transitions occur, for example, in case the at least three transducers are placed at, or against, the flow tube. In such a case, the transmitting transducer will insert the ultrasound signals into the fluid via the flow tube. Further, the transmitted ultrasound signals may propagate from the fluid to the flow tube, and vice versa, a couple of time before they reach the at least two non-transmitting transducers.

For example, in case the flow tube comprises steel, the transmission coefficient for ultrasound signals from the flow tube to the fluid is approximately between 0 and 0.1. The transmission coefficient for ultrasound signals from the fluid to the flow tube is then approximately between 1.9 and 2.0.

Medium transitions may also occur in case the at least three transducers are placed in the flow tube, i.e. in the fluid. The ultrasound signals may then propagate from, for example, piezo elements comprised by an ultrasound transducer to the fluid, and vice versa.

In the context of the invention, the step of determining an attenuation in amplitude of said received ultrasound signals may also be replaced by determining an amplification of said received ultrasound signals.

In an embodiment, the step of determining transmission coefficients comprises:

determining a velocity of a Scholte wave based on a time difference between said read out at least two non-transmitting transducers of said at least three transducers.

A Scholte wave is a surface wave interface wave propagating at an interface between a fluid and a solid medium, such as the flow tube. The wave is of maximum intensity at the interface and decreases exponentially away from the interface into both the flow tube and the fluid.

In another embodiment, the method comprises the step of:

determining a number of medium transitions for said transmitted ultrasound signals between said at least two non-transmitting transducers based on said determined velocity of said Scholte wave, and wherein said mass density is further determined based on said determined number of medium transitions.

Typically, a transmitting transducer is set to transmit signals at a certain frequency, or a set of frequencies. Based on a known, pre-determined, distance between the at least two non-transmitting transducers, the velocity of the Scholte wave, and the applied frequency for a transmitting transducer it is possible to determine the number of medium transitions for the transmitted ultrasound signals between the at least two non-transmitting transducers.

In a second aspect, the invention provides in a method for determining a flow rate for a fluid in a flow tube of a flow measurement system, said system comprising at least three ultrasound transducer circuitry, wherein each circuit comprises an ultrasound transducer arranged for transmitting ultrasound signals through said fluid in a transmitting phase, and for receiving transmitted signals from another of said at least three ultrasound transducers in a receiving phase, wherein said system comprises:

at least two receiving circuits, wherein said receiving circuits are arranged for said reading out of said at least two non-transmitting transducers, in their receiving phase, respectively, and a multiplexer circuit arranged for selectively connecting said receiving circuits to said transducers, wherein said method comprises the step of:

a1) exciting a first one of said at least three transducers to transmit said ultrasound signals, in said transmitting phase, and reading out at least two non-transmitting transducers of said at least three transducers, in their receiving phase, and wherein each exciting step comprises:

selectively connecting, using said multiplexer circuit, each of said at least two receiving circuits to one of said at least two non-transmitting ultrasound transducers, respectively, and wherein each exciting step (a1) is repeated at least once, wherein for each repeated exciting step said at least two receiving circuits are connected to a different one of said at least two non-transmitting ultrasound transducers, using said multiplexer circuit The inventors further found that time delays, time errors and/or time offsets occurring in the at least two receiving circuits also adversely affect the accuracy of the flow rate measurements.

These time delays, time errors and/or time offsets may be compensated, i.e. filtered out, in case the flow measurement system comprises a multiplexer circuit arranged for selectively connecting the receiving circuits to the non-transmitting transducers. The multiplexer circuit will thus, for example, connect each of the non-transmitting transducers to one of the receiving circuits, and does so for each exciting step, for example steps a1)-a4).

Here below, the above identified embodiment is, by way of example, explained with reference to three transducers and exactly two receiving circuits, in a more clear fashion. The basic concept is, however, applicable to more than two receiving circuits, as is clear for a skilled person in the art.

In step a1), the first transducer is excited to transmit ultrasound signals. The second and the third transducer are then each connected, using the multiplexer circuit, to one of the two receiving circuits, and are subsequently read out.

Step a1) is then repeated in that the first transducer is again excited to transmit ultrasound signals. The second and the third transducer are again each connected, using the multiplexer circuit, to one of the receiving circuits, and are subsequently read out. However, in this case, the second and the third transducer are connected to a different receiving circuit compared to the previous step a1), using the multiplexer.

In an example, the method further comprises the step of:

a2) exciting a second one of said at least three transducers to transmit said ultrasound signals, in said transmitting phase, and reading out at least two non-transmitting transducers of said at least three transducers, in their receiving phase, wherein said step a2) is also repeated at least once, wherein for each repeated exciting step (a1, a2) said at least two receiving circuits are connected to a different one of said at least two non-transmitting ultrasound transducers, using said multiplexer circuit.

It is further noted that the method examples as provided with respect to the second aspect of the invention may be combined with the method examples as provided with respect to the first aspect of the invention.

According to a third aspect, the invention provides a flow measurement system comprising a flow tube for the fluid whose flow rate is to be determined, said system comprising at least three ultrasound transducer circuitry, wherein each circuit comprises an ultrasound transducer arranged for transmitting ultrasound signals through said fluid in a transmitting phase, and for receiving transmitted signals from another of said at least three ultrasound transducers in a receiving phase, said system being arranged for:

a1) exciting a first one of said at least three transducers to transmit said ultrasound signals, in said transmitting phase, and reading out at least two non-transmitting transducers of said at least three transducers, in their receiving phase, and, determining a first time difference between two of said readings of said at least two non-transmitting transducers, and b) determining a velocity of said ultrasound signals through said fluid based on at least said determined difference, thereby eliminating a transmitting delay of said first one of said at least three transducers.

Here, the system may be further arranged for:

a2) exciting a second one of said at least three transducers to transmit said ultrasound signals, in said transmitting phase, and reading out at least two non-transmitting transducers of said at least three transducers, in their receiving phase, and, determining a second time difference between two of said readings of said at least two non-transmitting transducers;

and wherein said system is further arranged for:

b) determining a velocity of said ultrasound signals through said fluid based on at least said determined first time difference and said second time difference.

In a more detailed example, the system is further arranged for:

a3) exciting a third one of said at least three transducers to transmit said ultrasound signals, in said transmitting phase, and reading out at least two non-transmitting transducers of said at least three transducers, in their receiving phase.

In another example, said system is further arranged for:

determining an attenuation in amplitude of said received ultrasound signals based on said read out at least two non-transmitting transducers of said at least three transducers;

determining transmission coefficients for medium transitions occurring for said transmitted ultrasound signals between said at least two non-transmitting transducers, and based on said determined attenuation in amplitude;

determining a mass density of said fluid based on said determined attenuation and said determined transmission coefficients for determining a mass flow rate of said fluid.

It is noted that the advantages mentioned with respect to the method examples correspond to the advantages with respect to the system examples.

According to a fourth aspect, the invention provides for a flow measurement system comprising a flow tube for the fluid whose flow rate is to be determined, wherein said system comprises:

at least two ultrasound transducer circuitry, wherein each circuit comprises an ultrasound transducer arranged for transmitting ultrasound signals through said fluid in a transmitting phase, and for receiving transmitted signals from another of said at least two ultrasound transducers in a receiving phase, at least one receiving circuit, wherein each receiving circuit is arranged for reading out one of said at least two ultrasound transducers in a corresponding receiving phase thereof, and a multiplexer circuit arranged for selectively connecting said at least one receiving circuit between said at least two ultrasound transducers.

This fourth aspect of the invention is based on the insight that time delays, time errors and/or time offsets occurring in the at least one receiving circuit adversely affect the accuracy of the flow rate measurements.

These time delays, time errors and/or time offsets may be compensated, i.e. filtered out, in case the flow measurement system comprises a multiplexer circuit arranged for selectively connecting the at least one receiving circuit to one of said non-transmitting transducers.

In an embodiment, said at least two transducers are arranged to alternately transmit said ultrasound signals, and wherein said multiplexer circuit is arranged to alternately connect each of said at least one receiving circuits to one of said non-transmitting ultrasound transducers, respectively.

In the context of this embodiment, the at least two transducers are arranged to alternately transmit said ultrasound signals, which means that each of said at least two transducers are taking turns for transmitting ultrasound signals. As such, there is a particular order in which the at least two transducers transmit the ultrasound signals.

The remainder of the at least two transducers, i.e. the one(s) which is/are not transmitting, is/are then each uniquely connected to one of at least one receiving circuits, respectively. As such, the/these non-transmitting transducer(s) is/are controlled to its/their receiving phase for receiving transmitted signals from the one transmitting transducer.

As mentioned before, the benefit of an alternating order in which the at least two transducers transmit ultrasound signals, and thus also the alternating order in which the remainder of the at least two transducers are in their receiving phase, is that any errors, mismatches, time delays, etc., caused by the receiving circuit, or multiple receiving circuits, are averaged out.

In an embodiment, an alternating order of connecting each of said at least one receiving circuit to said one of said non-transmitting ultrasound transducers, respectively, is the same alternating order of said at least two ultrasound transducers which are alternately transmitting said ultrasound signals.

The advantage of this example is that each of the at least one receiving circuit is connected once to each of the at least two ultrasound transducers, thereby efficiently averaging out any time errors caused by the at least one receiving circuit.

In an embodiment, said system comprises at least three ultrasound circuitry, and wherein said at least three ultrasound transducers are successively placed after each other, and a physical distance between two successively placed ultrasound transducers is substantially equal.

The above means that each distance the ultrasound signals need to propagate through the fluid between two successively placed ultrasound transducers is substantially the same. In case, for example, the flow measurement system comprises three ultrasound transducers, the distance between the first and the second ultrasound transducer is substantially equal to the distance between the second and the third ultrasound transducer.

In an embodiment, said flow measurement system comprises three ultrasound transducer circuitry and two receiving circuits.

In practical situations, it seems that applying three ultrasound transducer circuitry, and thus three independent transducers, provides for flow rate results which are sufficiently accurate.

In an embodiment, each of said ultrasound transducer circuitry comprises a single load impedance via which a corresponding ultrasound transducer is excited to said transmitting phase and via which said corresponding ultrasound transducer is read out during said receiving phase.

The inventors noted that it may be beneficial if a single load impedance is used for activating an ultrasound transducer to its transmitting phase and for reading out that same transducer, by one of the at least one receiving circuits.

In an embodiment, said single load impedances of each said at least two transducer circuitry have a same value.

The advantage of this embodiment is that the accuracy of the measurements is improved even further. That is to say, the transmitting amplitude and/or the sound wave characteristics of each transmitting ultrasound transducer are made more uniform. Further, the receiving sensitivity as well as receiver characteristics of the ultrasound transducers, when in their receiving phase, are also made more uniform.

In an embodiment, each of said at least two ultrasound transducer circuitry comprise electronic switches, and wherein an ultrasound transducer is excited to said transmitting phase by shortly connecting its corresponding load impedance to a high supply voltage, and subsequently to a low supply voltage via corresponding electronic switches.

According to the present invention, in order to excite an ultrasound transducer to its transmitting phase, the ultrasound transducer may be shortly connected to a high supply voltage, and subsequently to a low supply voltage, which results in an excitation pulse to the ultrasound transducer.

After the excitation pulse, the ultrasound transducer is connected to ground, and continues a period of free oscillation which gradually decays to zero. During the free oscillation, the ultrasound transducer discharges itself over the same load impedance as is the case when that ultrasound transducer is in the receiving phase.

Connecting the at least two ultrasound transducers, each in time, to the high supply voltage and the low supply voltage may be accomplished by electronic switches, for example Field Effect Transistors, FET's, which are timely controlled by a micro controller.

In an embodiment, each of said multiple receiving circuits comprises an operational amplifier, for example an operational amplifier based buffer.

The advantage of an operational amplifier based buffer amplifier is that the input resistance of such an amplifier is very high such that the received ultrasound transducer signals by transducers in their receiving phase are not affected by the at least one receiving circuit.

In an embodiment, said at least three transducers are piezoelectric transducers.

Based on the above, the at least one receiving circuit may comprise a slope or edge detector for detecting a falling or a trailing edge. Whenever a ultrasound transducer is excited, it will generate movement in the form of sound through the fluid in the flow tube. The generated sound is then, subsequently, received by the other ultrasound transducers. In case of three ultrasound transducers, the following sequence may be followed.

1) A first ultrasound transducer is excited to transmit ultrasound signals through the fluid. These signals are received by the other two ultrasound transducers and read out via two receiving circuits, respectively. The multiplexer makes sure that the first receiving circuit is connected to the second transducer, and the second receiving circuit is connected to the third transducer.

2) The first ultrasound transducer is then de-activated, and the second ultrasound transducer is excited to transmit ultrasound signals through the fluid. The other two ultrasound transducers, i.e. the first and the third transducer, will then receive these transmitted ultrasound signals. The first and the third transducer are then read out via the same two receiving circuits, respectively. However, in this case, the multiplexer makes sure that the first receiving circuit is connected to the third transducer, and the second receiving circuit is connected to the first transducer, respectively.

3) The second ultrasound transducer is then de-activated, and the third ultrasound transducer is excited to transmit ultrasound signals through the fluid. The other two ultrasound transducers, i.e. the first and the second transducer, will then receive these transmitted ultrasound signals. The first and the second transducer are then, again, read out via the same two receiving circuits, respectively. However, in this case, the multiplexer makes sure that the first receiving circuit is connected to the first transducer, and the second receiving circuit is connected to the second transducer, respectively.

Finally, all the three above mentioned steps may be performed again. However, in this case, for each step, the two receiving circuits are differently connected to the two non-transmitting transducers.

Thus, in the first step:

the multiplexer makes sure that the second receiving circuit is connected to the second transducer, and the first receiving circuit is connected to the third transducer, respectively.

In the second step:

the multiplexer makes sure that the second receiving circuit is connected to the third transducer, and the first receiving circuit is connected to the first transducer, respectively.

In the third step:

the multiplexer makes sure that the second receiving circuit is connected to the first transducer, and the first receiving circuit is connected to the second transducer, respectively.

It is noted that the system examples with respect to the third aspect of the invention may be combined with the system examples with respect to the fourth aspect of the invention.

The invention provides, in a fifth aspect, in a method for measuring the flow rate of a fluid, using a flow measurement system according to any of the embodiments described above, said method comprising the steps of:

alternately exciting one of said ultrasound transducers;
alternately providing a remainder of said ultrasound transducers to said receiving phase by selectively connecting, using said multiplexer circuitry, each of said remainder of said transducers to a different one of said at least one receiving circuit, respectively.

In an embodiment, said step of alternately activating one of said ultrasound transducers to said transmitting phase further comprises:

providing separate control signals to said at least two ultrasound transducer circuitry having said ultrasound transducers, wherein said separate control signals are arranged to alternately activate one of said ultrasound transducers of said at least two ultrasound transducer circuitry to said transmitting phase.

In a further embodiment, said step of providing separate control signal further comprises the step of:

alternately connecting, by said multiplexer circuitry, each of said separate control signals to a different one of said at least two ultrasound transducer circuitry, respectively.

The expressions, i.e. the wording, of the different aspects comprised by the flow measurement system and/or the method according to the present invention should not be taken literally. The wording of the aspects is merely chosen to accurately express the rationale behind the actual function of the aspects.

In accordance with the present invention, different aspects applicable to the above mentioned examples of the method, including the advantages thereof, correspond to the aspects which are applicable to the flow measurement system according to the present invention.

The above-mentioned and other features and advantages of the invention will be best understood from the following description referring to the attached drawings. In the drawings, like reference numerals denote identical parts or parts performing an identical or comparable function or operation.

The invention is not limited to the particular examples disclosed below in connection with a particular type of flow measurement system.

Figure 1:
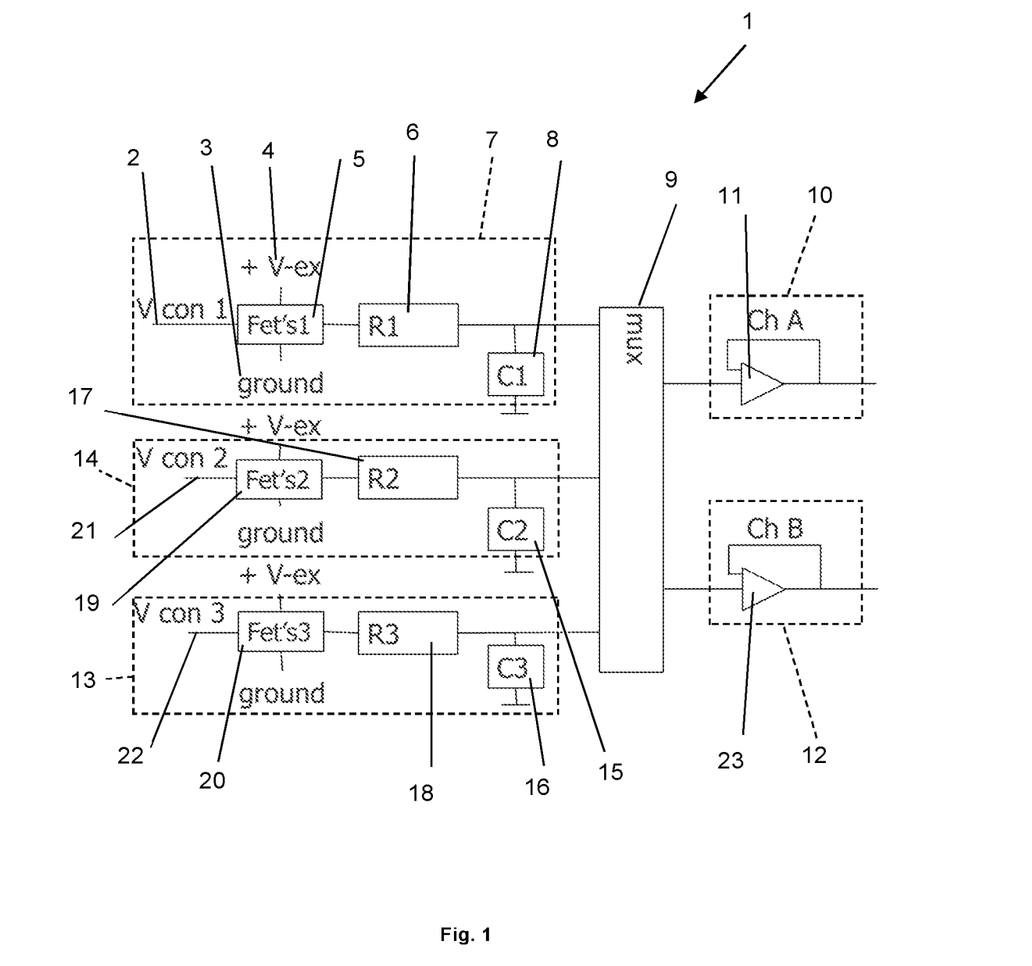
FIG. 1 is an example of a circuit topology for determining the flow rate of a fluid through a flow tube

FIG. 1 discloses a part of a flow measurement system 1, more specifically the electrical part. Not shown is a flow tube through which the fluid flows and whose flow rate, i.e. velocity of the fluid, is to be determined.

In this particular example, the flow measurement system 1 comprises three ultrasound transducer circuitry 7, 13, 14, each of which comprising a single ultrasound transducer C1-8, C2-15 and C3-16.

These ultrasound transducers C1-8, C2-15 and C3-16 are used for transmitting ultrasound signals through the fluid, in a transmitting phase, and are arranged for receiving transmitted signals, in a receiving phase.

The flow measurement system 1 further comprises two receiving circuits 10, 12, wherein each receiving circuit 10, 12 is arranged for reading out one of the three ultrasound transducers C1-8, C2-15 and C3-16, in a corresponding receiving phase thereof.

In the present example, the flow measurement system 1 comprises a multiplexer circuit 9 for selectively connecting each of the two receiving circuits 10, 12 to a different one of the three ultrasound transducers C1-8, C2-15 and C3-16.

This means that each receiving circuit 10, 12 is uniquely coupled, i.e. connected, to one of the three transducers C1-8, C2-15 and C3-16. For example, in case the first ultrasound transducer C1-8 is excited, i.e. it is transmitting ultrasound signals, the other two ultrasound transducers C2-15 and C3-16 may be in a receiving phase, i.e. receiving the ultrasound signals transmitted by the first transducer C1-8. The multiplexer circuit will then connect the second transducer C2-15 to the first receiving circuit 10, and will connect the third transducer C3-16 to the second receiving circuit 12.

The flow measurement system 1 is further arranged to alternately excite, or activate, one of the three transducers C1-8, C2-15 and C3-16 to transmit the ultrasound signals through the fluid. So, for example, initially, the first transducer C1-8 is excited to transmit ultrasound signals through the fluid. Then, the first transducer C1-8 is deactivated and the second transducer C2-15 is excited to transmit ultrasound signals through the fluid. Finally, the second transducer C2 is deactivated and the third transducer C3-16 is excited to transmit ultrasound signals through the fluid. This process may repeat itself continuously, preferably twice such that in total six times a transducers is excited.

The advantage of the above described process is that any time errors, mismatches, time delays, etc., caused by the three ultrasound transducer circuitry 7, 13, 14, as well as by the receiving circuit 10, 12 are averaged out.

As such, in order to facilitate the above described process, the inventors found that the two receiving circuits 10, 12 should be connected, each time, to the transducers which are not excited to transmit the ultrasound signals, i.e. the non-transmitting transducers which are to be placed in their receiving phase. The inventors found a solution by incorporating a multiplex circuit 9, which is arranged to uniquely connect each of the non-transmitting ultrasound transducers to one of the receiving circuits 10, 12, respectively.

The advantage hereof is that any errors, mismatches, time delays, etc., caused by the two receiving circuits 10, 12 are averaged out. In the present example, this works most efficiently in case each of the three ultrasound transducers C1-8, C2-15 and C3-16, for example piezoelectric transducers, have been in a transmitting phase at least once, such that the above described averaging effect is most efficient.

In an advantageous embodiment of the present invention, each ultrasound transducer C1-8, C2-15 and C3-16 is excited twice. The multiplexer circuit 9 will act differently the second time an ultrasound transducer C1-8, C2-15 and C3-16 is excited. The second time, the receiving circuits 10, 12 are differently connected to the corresponding receiving transducers, i.e. in a different manner.

For example, when the first transducer C1-8 is excited for the first time, the multiplexer circuit 9 will connect the first receiving circuit 10 to the second ultrasound transducer C2-15, and will connect the second receiving circuit 12 to the third ultrasound transducer C3-16.

When the first transducer C1-8 is excited for the second time, the multiplexer circuit 9 will connect the receiving circuits 10, 12 in a different manner to the second and third ultrasound transducer C2-15, C3-16. The multiplexer circuit 9 will connect the first receiving circuit 10 to the third ultrasound transducer C3-16, and will connect the second receiving circuit 12 to the second ultrasound transducer C2-15.

This enables an even more accurate determination of the flow rate of the fluid flowing through the flow tube.

In accordance with the present invention, the flow may comprise a fluid flow rate, a mass flow rate of the fluid and/or a volume flow rate of the fluid. Each of these different types of flow rates may be accurately determined by the flow measurement system and/or the method according the present invention.

As shown in FIG. 1, each ultrasound transducer circuit 7, 13, 14 may further comprise a plurality of components such as the ultrasound transducer C1-8, C2-15 and C3-16, the load impedances $R_1$-6, $R_2$-17, $R_3$-18 and electronic switches in the form of Field Effect Transistors, FET's, i.e. Fet's1-5, Fet's2-19 and Fet's3-20.

The load impedance of a particular transducer circuit, for example $R_1$-6 is used for exciting the corresponding ultrasound transducer 8 to the transmitting phase, during the free oscillation phase of the ultrasound transducer 8, but also during its corresponding receiving phase.

Each of the Fet's1-5, Fet's2-19 and Fet's3-20 in fact resemble an invertor circuit, wherein the corresponding control signals 2, 21, 22 determine whether the load impedance $R_1$-6, $R_{2\text{-}17}$, $R_3$-18 is connected to the high supply voltage, i.e. +V-ex-4, or the low supply voltage, for example ground 3. The control signals 2, 21, 22 are each provided to the gates of the corresponding Fet's1-5, Fet's2-19 and Fet's3-20.

In order to activate an ultrasound transducer C1-8, C2-15 and C3-16 to its transmitting phase, the ultrasound transducer C1-8, C2-15, C3-16 needs to be excited. This is accomplished by shortly connecting the transducer C1-8, C2-15 and C3-16 to the high supply voltage +V-ex-4, via its corresponding load impedance $R_1$-6, $R_2$-17, $R_3$-18, and subsequently to the low supply voltage, i.e. ground 3.

The excitation enables the transducer C1-8, C2-15 and C3-16 to start emitting ultrasound signals, i.e. sound, through the fluid, which signals may be picked up, i.e. received, by the other transducers, i.e. non-transmitting transducers.

The benefit of all the above is that each transducer C1-8, C2-15 and C3-16 is excited, and read out, over the same load impedance value. For example the first transducers C1-8, is activated via its corresponding load impedance $R_1$-6 and is also read out, by one of the receiving circuits 10, 12, when the transducer 8 is de-charged via its load impedance $R_1$-6 to, for example, ground 3.

In order to tune the different ultrasound transducer circuitry 7, 13, 14 to each other, the load impedances $R_1$-6, $R_2$-17, $R_3$-18 may have a same value.

As shown in FIG. 1, the receiving circuits 10, 12 may comprise an operational amplifier based buffer amplifier 11, 23. The advantage hereof is that the input impedance of such an amplifier is large, i.e. in the order of mega ohms or even giga ohms, such that the receiving circuit 10, 12 will not influence the de-charging of the transducers C1-8, C2-15 and C3-16, during reading out thereof.

The control signals 2, 21, 22 may be provided by a Field Programmable Gate Array, FPGA, a micro processor or the like, which devices are used for controlling the timing, i.e. the moments when the transducers are to be in their transmitting phase and receiving phase.

As mentioned previously, the method according to the present invention is suitable for determining the mass flow rate of the fluid through the flow tube. This principle is explained in more detail hereafter.

First, one of the transducers C1-8, C2-15 and C3-16, for example the first transducer C1-8, is excited, i.e. it is transmitting ultrasound signals, and the other two ultrasound transducers C2-15 and C3-16 are provided in a receiving phase, i.e. receiving the ultrasound signals transmitted by the first transducer C1-8. The multiplexer circuit 9 will, for example, connect the second transducer C2-15 to the first receiving circuit 10, and will connect the third transducer C3-16 to the second receiving circuit 12.

The second transducer C2-15 and the third transducer C3-16 are both placed either upstream, or downstream, to the first transducer C1-8. As such, the attenuation, or amplification, of the amplitude of the received ultrasound signals at the second transducer C2-15 and the third transducer C3-16 can be derived via:

$$\alpha = A2/A3.$$

Here, α represents the amplification with respect to the amplitude A2 of the ultrasound signal received at the second transducer C2-15 and the amplitude A3 of the ultrasound signal received at the third transducer C3-16.

It was the insight of the inventor that the decrease in amplitude of the ultrasound signals is mainly determined by the transmissions of the ultrasound signals between the fluid and the flow tube, and vice versa.

The transmission coefficient related to a transition of the ultrasound signals from a solid to a fluid is defined as:

$$T_r = 2r/(r+1), \text{ wherein } r = Z2/Z1 \text{ and } Z = \rho c.$$

Here, the first material represents the material for the flow tube, for example, steel, and the second material represents the fluid. The symbol "ρ" represents the density of the corresponding material and the symbol "c" represents the velocity of the ultrasound signals through the corresponding material.

Similarly, the transmission coefficient related to a transition of the ultrasound signals from a fluid to a solid is defined as:

$T_{rb}=2r/(r+1)$, wherein $r=Z2/Z1$ and $Z=\rho c$

Here, the first material is thus the fluid and the second material is thus steel, i.e. representing the flow tube.

In case the velocity of the Scholte wave is known beforehand, or determined using the method according to the present invention, and in case the distance between the transducers C1-8, C2-15 and C3-16 is known, and in case the frequency of the transmitted ultrasound signals is known, the number of times that the ultrasound signals transition from the solid to the fluid and/or vice versa can be determined via:

$\lambda=c/f$;

$n=x/\lambda$;

$\alpha=n \cdot T_r \cdot T_{rb}$

Here, the symbol "$\lambda$" represents the wavelength of the transmitted ultrasound signals, the symbol "f" represents the frequency of the transmitted ultrasound signals, the symbol "n" represent the number of times that the ultrasound signals transition from the solid to the fluid and/or vice versa, the symbol "x" represents the distance between the second transducer C2-15 and the third transducer C3-16.

The value for the density "$\rho$" of the fluid may then be determined iteratively as follows. First, it is assumed that the fluid is water. The transmission coefficient for the transition of ultrasound signals from water to steel is known, i.e. "$T_{rb}$" is known to be approximately 1.94. As the remaining parameters are known, or can be determined via the method according to the present invention, the value for the density "$\rho$" can be determined. Then, the value for "$T_{rb}$" is determined again, using the determined value for the density "$\rho$". This process is repeatedly, for example once or several times, until a reasonable constant value for the density "$\rho$" is obtained.

Based on the density "$\rho$" of the fluid, and a (determined) fluid flow rate, the mass flow rate of the fluid can be established.

Figure 2:
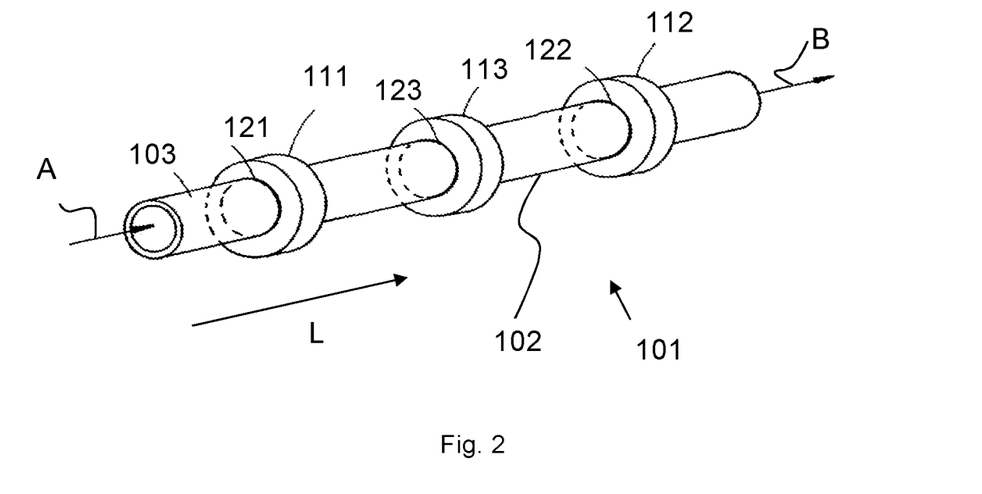
FIG. 2 is an example of a flow tube comprising three ultrasound transducers.

FIG. 2 shows a flow meter 101 for in in a system according to the present invention, in perspective view. The flow meter 101 comprises a flow tube 102 for the medium whose flow is to be measured. The flow tube has an outer jacket 103. The flow tube is provided with an inlet A and an outlet B. The flow tube is preferably an elongate, straight tube 102, which extends in a longitudinal direction L.

Provided on the outer jacket 103 of the flow tube 102 is a first ultrasound transducer 111, which is ring-shaped in the illustrated embodiment, and which is provided entirely around the circumference of the tube 102. The first oscillator 111 is in acoustic contact with the outer jacket 103 of the flow tube 102 via an acoustically conductive layer 121.

Provided at a position longitudinally spaced from the first ultrasound transducer 111 is a second ultrasound transducer 113, which is in contact with the outer jacket 103 of the flow tube 102 by means of an acoustically conductive layer 123.

Provided at a position longitudinally spaced from the second ultrasound transducer 113 is a third ultrasound transducer 112, which is likewise in contact with the outer jacket 103 of the flow tube 102, in this case via an acoustically conductive layer 122.

The first ultrasound transducer 111, the second ultrasound transducer 113 and the third ultrasound transducer 112 may be configured as piezo elements. The piezo element may in that case comprise a piezo film. It is further conceivable that the receiving element is a PZT element, comprises a PVDF material or is a ceramic crystal.

In accordance with the present invention, the three transducers 111, 113, 112 are each excited in a certain order and, the ones which are not excited, are read out via a corresponding receiving circuit. Table 1 provides an example of the order in which the three transducers 111, 113, 112 are excited, and which of the three transducers 111, 113, 112 are connected to receiving circuits.

TABLE 1

| Excited transducer | Receiving circuit one | Receiving circuit two |
| --- | --- | --- |
| First transducer 111 | Second transducer 113 | Third transducer 112 |
| First transducer 111 | Third transducer 112 | Second transducer 113 |
| Second transducer 113 | First transducer 111 | Third transducer 112 |
| Second transducer 113 | Third transducer 112 | First transducer 111 |
| Third transducer 112 | Second transducer 113 | First transducer 111 |
| Third transducer 112 | First transducer 111 | Second transducer 113 |

The above table thus shows the order in which the transducers are excited (first column), which transducer is connected to the first receiving circuit (second column) and which transducer is connected to the second receiving circuit (third column).

The skilled person will appreciate that the invention has been explained in the foregoing with reference to preferred embodiments of the invention. The invention is not limited to these embodiments, however.

Thus it is conceivable, for example, that additional ultrasound transducer circuitry and/or receiving circuits are provided.

Accordingly, various modifications are conceivable within the framework of the invention. The scope of the protection sought is determined by the appended claims.

The invention claimed is:

1. A method for determining a flow rate for a fluid in a flow tube of a flow measurement system, wherein said system comprises at least three ultrasound transducer circuitry, wherein each circuit comprises an ultrasound transducer arranged for transmitting ultrasound signals through said fluid in a transmitting phase and for receiving transmitted signals from another of said at least three ultrasound transducers in a receiving phase, said method comprising the steps of:
   a1) exciting a first one of said at least three transducers to transmit said ultrasound signals, in said transmitting phase, and reading out at least two non-transmitting transducers of said at least three transducers, in their receiving phase, and determining a first time difference between two of said readings of said at least two non-transmitting transducers,
   b) determining a velocity of said ultrasound signals through said fluid based on at least said determined difference thereby eliminating a transmitting delay of said first one of said at least three transducers;
   c) determining an attenuation in amplitude of said received ultrasound signals based on said read out of at least two non-transmitting transducers of said at least three transducers;
   d) determining transmission coefficients for medium transitions occurring for said transmitted ultrasound signals between said at least two non-transmitting transducers, comprising determining a velocity of a Scholte wave based on a time difference between said read out of at least two non-transmitting transducers of said at least three transducers; and e) determining a mass density of said fluid, based on said determined attenuation in amplitude and said determined transmission coefficients for medium transitions, for determining a mass flow rate of said fluid.

2. The method for determining a flow rate according to claim 1, further comprising the step of:

a2) exciting a second one of said at least three transducers to transmit said ultrasound signals, in said transmitting phase, and reading out at least two non-transmitting transducers of said at least three transducers, in their receiving phase, and determining a second time difference between two of said readings of said at least two non-transmitting transducers;

and wherein said step b) further comprises determining a velocity of said ultrasound signals through said fluid based on at least said determined first time difference and said second time difference.

3. The method for determining a flow rate according to claim 1, further comprising the step of:

a3) exciting a third one of said at least three transducers to transmit said ultrasound signals, in said transmitting phase, and reading out at least two non-transmitting transducers of said at least three transducers, in their receiving phase.

4. The method for determining a flow rate according to claim 3, further comprising the step of:

a4) alternately exciting a remainder of said at least three transducers to transmit said ultrasound signals, in said transmitting phase, and reading out, for each alternately excited transducer, at least two non-transmitting transducers of said at least three transducers, in their receiving phase.

5. The method for determining a flow rate according to claim 1, wherein each of said method steps are performed multiple times.

6. The method for determining a flow rate according to claim 1, wherein said method comprises the step of:

determining a number of medium transitions for said transmitted ultrasound signals between said at least two non-transmitting transducers based on the determined velocity of said Scholte wave, and wherein said mass density is further determined based on said determined number of medium transitions.

7. The method for determining a flow rate according to claim 1, wherein said medium transitions comprise transitions of said ultrasound signals from said flow tube to said fluid and from said fluid to said flow tube.

8. A method for determining a flow rate for a fluid in a flow tube of a flow measurement system, wherein said system comprises:

at least three ultrasound transducer circuitry, wherein each circuit comprises an ultrasound transducer arranged for transmitting ultrasound signals through said fluid in a transmitting phase and for receiving transmitted signals from another of said at least three ultrasound transducers in a receiving phase;

at least two receiving circuits, wherein said receiving circuits read out said at least two non-transmitting transducers, in their receiving phase, respectively; and a multiplexer circuit for selectively connecting said receiving circuits to said transducers, wherein said method comprises the step of:

a1) exciting a first one of said at least three transducers to transmit said ultrasound signals, in said transmitting phase, and reading out at least two non-transmitting transducers of said at least three transducers, in their receiving phase, wherein said exciting comprises:

selectively connecting, using said multiplexer circuit, each of said at least two receiving circuits to one of said at least two non-transmitting ultrasound transducers, respectively, and, wherein said exciting step (a1) is repeated at least once, wherein for each repeated exciting step said at least two receiving circuits are connected to a different one of said at least two non-transmitting ultrasound transducers using said multiplexer circuit;

b) determining a velocity of said ultrasound signals through said fluid based on at least said determined difference, thereby eliminating a transmitting delay of said first one of said at least three transducers;

c) determining an attenuation in amplitude of said received ultrasound signals based on said read out of at least two non-transmitting transducers of said at least three transducers;

d) determining transmission coefficients for medium transitions occurring for said transmitted ultrasound signals between said at least two non-transmitting transducers, comprising determining a velocity of a Scholte wave based on a time difference between said read out of at least two non-transmitting transducers of said at least three transducers; and e) determining a mass density of said fluid, based on said determined attenuation in amplitude and said determined transmission coefficients for medium transitions, for determining a mass flow rate of said fluid.

9. The method for determining a flow rate according to claim 8, wherein said method further comprises the step of:

a2) exciting a second one of said at least three transducers to transmit said ultrasound signals, in said transmitting phase, and reading out at least two non-transmitting transducers of said at least three transducers, in their receiving phase, wherein said step a2) is also repeated at least once, wherein for each repeated exciting step a1 and a2 said at least two receiving circuits are connected to a different one of said at least two non-transmitting ultrasound transducers using said multiplexer circuit.

10. A flow measurement system comprising:

a flow tube for a fluid whose flow rate is to be determined;

at least three ultrasound transducer circuitry, wherein each circuit comprises an ultrasound transducer arranged for transmitting ultrasound signals through said fluid in a transmitting phase, and for receiving transmitted signals from another of said at least three ultrasound transducers in a receiving phase, wherein said system a1) excites a first one of said at least three transducers to transmit said ultrasound signals, in said transmitting phase, and reads out at least two non-transmitting transducers of said at least three transducers, in their receiving phase, and determines a first time difference between two of said readings of said at least two non-transmitting transducers, and b) determines a velocity of said ultrasound signals through said fluid based on at least said determined difference thereby eliminating a transmitting delay of said first one of said at least three transducers;

c) determines an attenuation in amplitude of said received ultrasound signals based on said read out of at least two non-transmitting transducers of said at least three transducers;

d) determines transmission coefficients for medium transitions occurring for said transmitted ultrasound signals between said at least two non-transmitting transducers, comprising determining a velocity of a Scholte wave based on a time difference between said read out of at least two non-transmitting transducers of said at least three transducers; and e) determines a mass density of said fluid, based on said determined attenuation in amplitude and said determined transmission coefficients for medium transitions, for determining a mass flow rate of said fluid.

11. The flow measurement system according to claim 10, wherein said system:

a2) excites a second one of said at least three transducers to transmit said ultrasound signals, in said transmitting phase, and reads out at least two non-transmitting transducers of said at least three transducers, in their receiving phase, and determines a second time difference between two of said readings of said at least two non-transmitting transducers; and b) determines a velocity of said ultrasound signals through said fluid based on at least said determined first time difference and said second time difference.

12. The flow measurement system according to claim 11, wherein said system:

a3) excites a third one of said at least three transducers to transmit said ultrasound signals, in said transmitting phase, and reads out at least two non-transmitting transducers of said at least three transducers, in their receiving phase.

13. A flow measurement system comprising:

a flow tube for a fluid whose flow rate is to be determined;

at least two ultrasound transducer circuitry, wherein each circuit comprises an ultrasound transducer arranged for transmitting ultrasound signals through said fluid in a transmitting phase, and for receiving transmitted signals from another of said at least two ultrasound transducers in a receiving phase, at least one receiving circuit, wherein each receiving circuit is arranged for reading out one of said at least two ultrasound transducers in a corresponding receiving phase thereof, and a multiplexer circuit arranged for selectively connecting said at least one receiving circuit between said at least two ultrasound transducers, wherein said system a1) excites a first one of said at least two transducers to transmit said ultrasound signals, in said transmitting phase, and reads out at least two non-transmitting transducers of said at least three transducers, in their receiving phase, and determines a first time difference between two of said readings of said at least two non-transmitting transducers, and b) determines a velocity of said ultrasound signals through said fluid based on at least said determined difference thereby eliminating a transmitting delay of said first one of said at least two transducers;

c) determines an attenuation in amplitude of said received ultrasound signals based on said read out of at least two non-transmitting transducers of said at least three transducers;

d) determines transmission coefficients for medium transitions occurring for said transmitted ultrasound signals between said at least two non-transmitting transducers, comprising determining a velocity of a Scholte wave based on a time difference between said read out of at least two non-transmitting transducers of said at least three transducers; and e) determines a mass density of said fluid, based on said determined attenuation in amplitude and said determined transmission coefficients for medium transitions, for determining a mass flow rate of said fluid.

14. The flow measurement system according to claim 13, wherein said at least two transducers alternately transmit said ultrasound signals, and wherein said multiplexer circuitry alternately connects each of said at least one receiving circuits to one of said non-transmitting ultrasound transducers, respectively.

15. The flow measurement system according to claim 14, wherein an alternating order of connecting each of said multiple receiving circuits to said one of said non-transmitting ultrasound transducers, respectively, is the same alternating order of said at least two ultrasound transducers which are alternately transmitting said ultrasound signals.

16. The flow measurement system according to claim 13, wherein said system comprises at least three ultrasound circuitry, wherein each circuit comprises an ultrasound transducer arranged for transmitting ultrasound signals through said fluid in a transmitting phase and for receiving transmitted signals in a receiving phase, and wherein said at least three ultrasound transducers are successively placed after each other and wherein a physical distance between two successively placed ultrasound transducers is substantially equal.

17. The flow measurement system according to claim 13, wherein said flow measurement system comprises three ultrasound transducer circuitry and two receiving circuits.

18. The flow measurement system according to claim 13, wherein each of said ultrasound transducer circuitry comprises a single load impedance via which a corresponding ultrasound transducer is excited to said transmitting phase and via which said corresponding ultrasound transducer is read out during said receiving phase.

19. The flow measurement system according to claim 18, wherein each of said at least two ultrasound transducer circuitry comprise electronic switches, and wherein an ultrasound transducer is excited to said transmitting phase by shortly connecting its corresponding load impedance to a high supply voltage, and subsequently to a low supply voltage via corresponding electronic switches.

20. The flow measurement system according to claim 18, wherein said single load impedances of each said at least two transducer circuitry have a same value.

21. The flow measurement system according to claim 13, wherein each of said multiple receiving circuits comprises an operational amplifier.

22. The flow measurement system according to claim 13, wherein said at least two transducers are piezoelectric transducers.

* * * * *